(12) United States Patent
Liu et al.

(10) Patent No.: US 9,159,369 B1
(45) Date of Patent: Oct. 13, 2015

(54) MR-OFFSET CHANGE DETECTION AND COMPENSATION

(71) Applicant: Seagate Technology LLC, Cupertino, CA (US)

(72) Inventors: Xiong Liu, Singapore (SG); ChengYi Guo, Singapore (SG); Jui Jing Lim, Singapore (SG); HtayNwe Aung, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/640,852

(22) Filed: Mar. 6, 2015

(51) Int. Cl.
*G11B 27/36* (2006.01)
*G11B 5/455* (2006.01)
*G11B 20/18* (2006.01)
*G11B 5/596* (2006.01)
*G11B 5/55* (2006.01)

(52) U.S. Cl.
CPC ............... *G11B 27/36* (2013.01); *G11B 5/455* (2013.01); *G11B 5/5565* (2013.01); *G11B 5/59672* (2013.01); *G11B 20/182* (2013.01); *G11B 5/59627* (2013.01)

(58) Field of Classification Search
CPC ............. G11B 5/59672; G11B 5/5565; G11B 5/59627; G11B 5/59683; G11B 5/02; G11B 5/455; G11B 2005/0016; G11B 27/36; G11B 5/12; G11B 2220/20; G11B 20/182
USPC ........ 360/67, 55, 75, 77.06, 78.04, 31, 77.02, 360/66
See application file for complete search history.

(56) References Cited

U.S. PATENT DOCUMENTS

| | | | |
|---|---|---|---|
| 5,986,847 A | 11/1999 | Park et al. | |
| 6,061,201 A | 5/2000 | Woods | |
| 6,498,693 B1 * | 12/2002 | Au et al. | 360/31 |
| 6,873,488 B2 | 3/2005 | Teo et al. | |
| 7,177,112 B2 | 2/2007 | Settje et al. | |
| 7,486,468 B2 | 2/2009 | Hebbar et al. | |
| 7,593,180 B2 | 9/2009 | Yun et al. | |
| 8,154,820 B1 | 4/2012 | Madden et al. | |
| 8,699,165 B2 | 4/2014 | Huang et al. | |
| 8,705,198 B1 * | 4/2014 | Hebbar et al. | 360/76 |
| 8,817,410 B1 | 8/2014 | Moser et al. | |
| 8,829,901 B2 | 9/2014 | Pant | |

* cited by examiner

*Primary Examiner* — Ali Neyzari
(74) *Attorney, Agent, or Firm* — Taylor English Duma LLP (57) ABSTRACT

A method, computer-readable medium, and storage device for detecting and compensating for a change in MR-offset in a disk-based storage device. A pattern is written to a track on a disk of the storage device utilizing a read/write head. The read channel of the storage device is then configured as a harmonic sensor and the pattern is read from the track at a specific off-track position of the read/write head. The magnitude of the harmonic sensor is measured during the read, and the change in MR-offset is calculated for the read/write head based on the measured magnitude value and a predetermined transfer function between off-track amount and harmonic sensor magnitude. The change in MR-offset may then be utilized by a servo mechanism of the storage device to correct head positioning during a write operation for the read/write head.

20 Claims, 7 Drawing Sheets

MR-OFFSET CHANGE DETECTION AND COMPENSATION

BACKGROUND

1. Field of the Invention

The disclosure generally relates to technologies for detecting and compensating for a change in MR-offset in disk-based storage devices.

2. Background Art

Not Applicable

BRIEF SUMMARY

The present disclosure relates to technologies for detecting and compensating for a change in MR-offset in a disk-based storage device. According to some embodiments, a method for determining a change in MR-offset of a read/write head comprises writing a pattern to a track on a disk of the storage device utilizing the read/write head. The read channel of the storage device is then configured as a harmonic sensor and the pattern is read from the track at a specific off-track position of the read/write head. The magnitude of the harmonic sensor is measured during the read; and the change in MR-offset is calculated for the read/write head based on the measured magnitude value and a predetermined transfer function between off-track amount and harmonic sensor magnitude. The change in MR-offset may then be utilized by a servo mechanism of the storage device to correct head positioning during a write operation for the read/write head.

According to further embodiments, a storage device comprises a processor and a memory. The memory contains a MR-offset change detection module configured to write a pattern based on a specific frequency to a track on a recording surface of the storage device. A read channel of the storage device is configured as a harmonic sensor for the specific frequency and the pattern is read from the track at a specific off-track position. A magnitude value is measured from the harmonic sensor during the read and utilized to calculate a change in MR-offset for a read/write head associated with the recording surface along with a transfer function expressing a relationship between off-track amounts and harmonic sensor magnitudes. The change in MR-offset is then stored in the memory associated with the read/write head According to further embodiments, a computer-readable medium has processor-executable instructions stored thereon that, when executed by a processor operably connected to a storage device, cause the processor to write a specific frequency pattern to a track in a reserved area of a disk of the storage device. A read channel of the storage device is configured as a harmonic sensor for the specific frequency, and the track in the reserved area is read at a specific off-track position. A magnitude value from the harmonic sensor is measured during the read, and a change in MR-offset for a read/write head associated with the disk is calculated based on the measured magnitude value and a transfer function expressing a relationship between off-track amounts and harmonic sensor magnitudes. The change in MR-offset may then be utilized by a servo mechanism of the storage device to correct head positioning during a write operation for the read/write head.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for detecting and compensating for a change in magneto-resistive ("MR") offset in a disk-based storage device, such as a hard-disk drive ("HDD") apparatus. MR-offset in an HDD or other disk-based storage device refers to a distance between the center of the writer element and the center of the reader element on the read/write head(s) in the device. As is known in the art, the MR-offset value varies according to the position of the read/write head over the disk and is a function of the design (position, orientation, and number) of reader element(s) and write element(s) on the read/write head, distances between actuator pivot, spindle center, and/or the read write head, and the like and. In order to make the reader elements of the head exactly follow tracks written by the writer elements, the MR-offset must be taken into consideration when positioning the head over the target track.

Internal and external stress conditions applied to the storage device may result in a change in MR-offset for a given head. For example, large mechanical shocks (both operating and non-operating) of an HDD or other disk-based storage device may result in actuator-shift and/or other mechanical changes in the conditions related to MR-offset. For HDDs with a high areal density, the MR-offset change induced by actuator-shift may be significant. Uncompensated changes in MR-offset may cause adjacent track erasure in write operations and off-track reads, resulting in unrecoverable data errors ("UDEs") and affecting reliability of the storage device.

During the configuration and certification testing ("CERT") of the HDD by the manufacturer, the MR-offset for each read/write head may be initially calibrated at several positions over the corresponding disk recording surface and the MR-offset values stored in a memory. The MR-offset values may then be utilized by the drive controller to compensate for the MR-offset of the head during normal operation of the drive (also referred to herein as "user mode").

However, conventional HDDs typically lack the ability to detect change in MR-offset of a read/write head during normal operation, such as that resulting from actuator-shift, and compensate for the change in MR-offset in order to avoid unrecoverable errors and other reliability problems of the device that may result.

Figure 1:
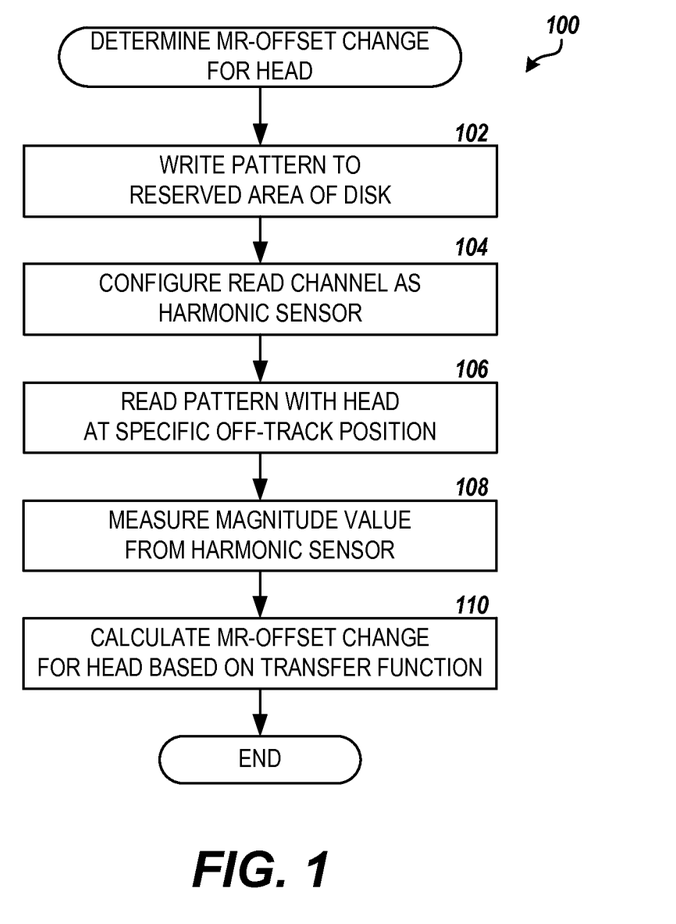
FIG. 1 is a flow diagram showing one routine for detecting a change in MR-offset in a disk-based storage device, according to embodiments described herein.

Utilizing embodiments described herein, a method for detecting a change in the MR-offset may be implemented in a HDD or other disk-based storage device to improve drive robustness. The MR-offset change is detected by using a harmonic sensor in the read channel of the device. The MR-offset change may then be utilized to compensate for the new MR-offset through the servo mechanism of the storage device. FIG. 1 illustrates one routine 100 for detecting a change in MR-offset for a read/write head in a storage device. According to some embodiments, the routine 100 may be performed by a controller of the device.

The routine 100 includes step 102, where a data pattern is written by the read/write head to a reserved area of the corresponding recording surface of a disk in the storage device. The data pattern is configured to create a write signal of a specific frequency for which the harmonic sensor can be calibrated for detection. In some embodiments, a 2T, 3T, 4T, etc. fixed pattern may be chosen, where T represents the time interval for one bit on the recording surface at a fixed disk speed. According to some embodiments, the reserved area of the disk may comprise a number of tracks on the recording surface according to the amount of change in MR-offset that can occur in the storage device. For example, in HDDs with high areal storage density, an actuator-shift caused by non-operating shock ("NOS") may create a change in MR-offset of as much as ±69% of the track-pitch. Therefore, the reserved area may comprise three data tracks on the recording surface of the disk to account for the amount of MR-offset that can occur.

In some embodiments, the reserved area may be located at or near the inner diameter ("ID") of the disk since MR-offset change due to actuator-shift may be the largest at the ID. According to further embodiments, the data pattern is written to only a portion of the target track in the reserved area. For example, the data pattern may only be written to 80% of the data track. This allows additional time to configure the read channel for the read operation in step 106 before a full rotation of the disk brings the beginning of the written track back under the rad/write head. In this way, the change in MR-offset may be detected in only 2 revolutions of the disk, or under 25 ms in modern HDD devices.

From step 102, the routine 100 proceeds to step 104, where the read channel of the storage device is configured for harmonic sensor data collection. According to embodiments, the read channel of the storage device includes a harmonic sensor that may be configured to measure the strength of the read signal at a configured frequency. The harmonic sensor provides superior detection performance because it has good noise rejection capability since it is configured to detect a signal of a fixed frequency and has good measurement repeatability in terms of magnitude of the configured frequency signal. The harmonic sensor in read channel of the storage device is configured to detect the magnitude of the read signal at the specific frequency of the write signal chosen above in step 102.

The routine 100 proceeds from step 104 to step 106, where the data pattern is read from the track in the reserved area at a specific off-track position of the read/write head. For example, the track may be read with the read head off-center by 70% of track pitch. The selected off-track position may be chosen based upon the linearity of the transfer function between offset position and magnitude detected by the harmonic sensor, as will be described below. According to some embodiments, the selected off-track position will be between 50% and 80%. While the data pattern is read by the read/write head from the track in the reserved area at the selected off-track position, the magnitude of the harmonic sensor is measured, as shown at step 108.

From step 108, the routine 100 proceeds to step 110, where the change in MR-offset for the read/write head is calculated based on the measured magnitude value from the harmonic sensor and a predetermined transfer function between off-track amount and harmonic sensor magnitude and the measured magnitude value from the harmonic sensor. In some embodiments, the transfer function may be determined for the drive during CERT testing of the device and stored in a memory of the device. In other embodiments, the transfer function may be determined for the model device by the manufacturer based on the head, media, channel electrical parameters, fly-height, and the like.

Figure 2:
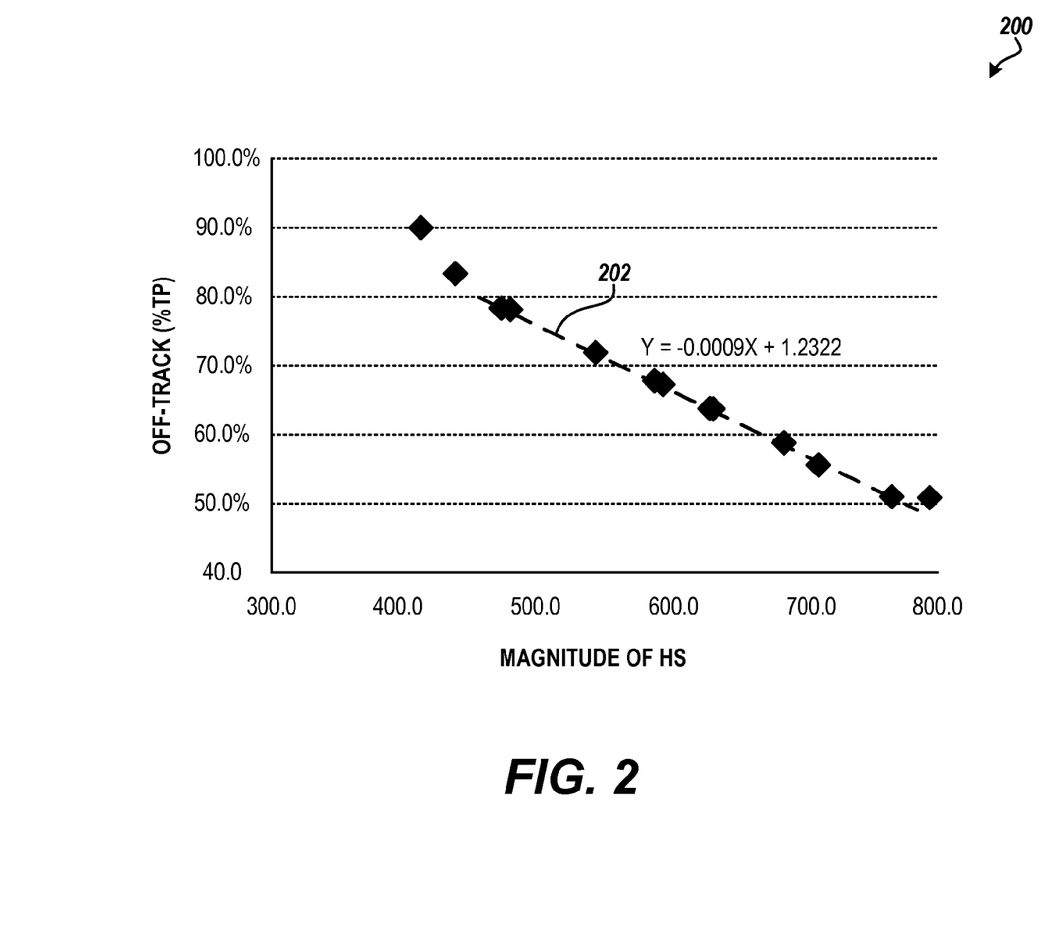
FIG. 2 is a graph illustrating one relationship between harmonic sensor magnitude and off-track position of a read/write head in the storage device, according to embodiments described herein.

FIG. 2 provides an example of a transfer function 200 for a read/write head of an HDD device that may be determined at CERT testing of the device. As may be seen at 202 in the figure, the transfer function may be substantially linear within some range of off-track values, e.g. between 50% and 80% off-track. The controller of the device may calculate the change in MR-offset for the read/write head by comparing the off-track position expected from the transfer function for the magnitude of the harmonic sensor to the off-track position selected for the read in step 108 above. For example, if the pattern is read at 70% off-track and the magnitude of the harmonic sensor measured corresponds to 80% off-track according to the transfer function 200, then the change in MR-offset for the head is calculated to be +10% (indicating that the distance from the pivot point to the spindle motor has decreased). Similarly, if the harmonic sensor measured corresponds to 60% off-track according to the transfer function 200, then the change in MR-offset for the head is calculated to be −10% (indicating that the distance from the pivot point to the spindle motor has increased).

However, the actual amount of change in MR-offset may result in a measured magnitude of the harmonic sensor that is outside the linear range of the transfer function, resulting in a potentially inaccurate calculation of the change in MR-offset for the head. For example, if a +40% change in MR-offset occurs as a result of a NOS or other shock and the pattern is read at 70% off-track, the magnitude of the harmonic sensor measured may roughly correspond to 110% off-track, which is outside the linear range, shown at 202, of the transfer function 200 of FIG. 2. According to some embodiments, if the off-track amount corresponding to the measured magnitude of the harmonic sensor is outside the liner range of the transfer function 200, then the data pattern is re-read from the track in the reserved area at a new off-track position of the read/write head. The new off-track position may be determined based on the measured magnitude of the harmonic sensor from the previous read. For example, in the scenario described above, the pattern may be re-read at 35% off-track position. The resulting magnitude measured from the harmonic sensor should, therefore, correspond to 75% off-track, which is an acceptable as it is inside the linear range of the transfer function 200. From this second read and measurement, the change in MR-offset may accurately be determined to be +40%. From step 110, the routine 100 ends.

Figure 3:
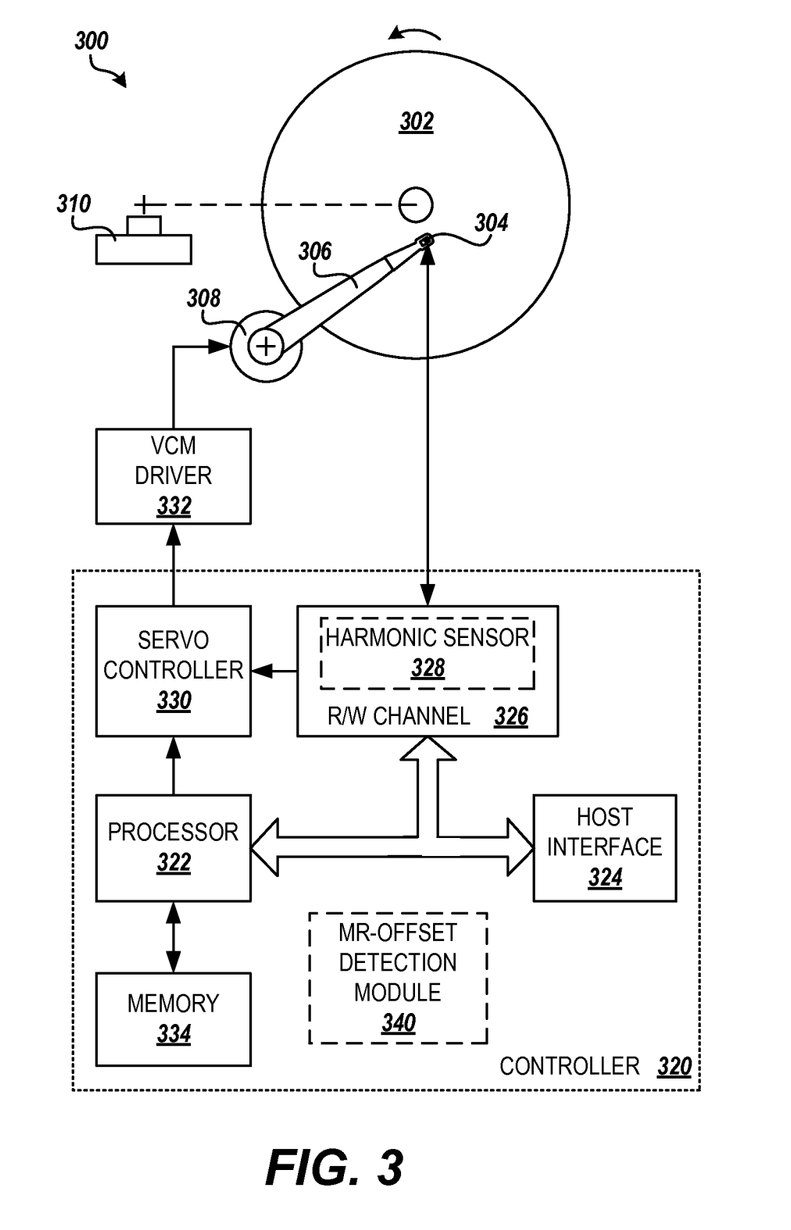
FIG. 3 is a block diagram showing an illustrative environment for detecting and compensating for a change in MR-offset in a storage device, according to embodiments described herein.

FIG. 3 and the following description are intended to provide a general description of a suitable environment in which the embodiments described herein may be implemented. In particular, FIG. 3 shows an illustrative disk-based storage device 300, such as an HDD apparatus, along with hardware, software and components for detecting and compensating for a change in MR-offset in a disk-based storage device, according to the embodiments provided herein. The storage device 300 may include recording media comprising at least one platter or disk. Each disk may include one or two magnetic recording surfaces 302. For operation of the storage device 300, the recording surface 302 may be divided or "formatted" into a number of individual data tracks representing substantially concentric circular areas on the surface where user data is stored.

The storage device 300 further includes at least one read/write head 304 associated with and located adjacent to each recording surface 302. The read/write head 304 may read information from the recording surface 302 by sensing a magnetic field formed on portions of the surface of the disk, and may write information by magnetizing a portion of the recording surface of the disk. The read/write head 304 may be located at the distal end of an arm 306 that is rotated by a VCM or other actuator 308 in order to position the read/write head 304 over locations on the recording surface 302 for a read or write operations. According to embodiments, the read/write head 304 includes one or more magnetic writer elements, magneto-resistive ("MR") reader elements, tunneling MR reader elements, writer shields, sliders, and the like.

The storage device 300 may further comprise a controller 320 that controls the operations of the storage device. The controller 320 may include a processor 322. The processor 322 may implement a host interface 324 allowing the storage device 300 to communicate with a host device, other parts of the storage device 300, or other components, such as a server computer, personal computer ("PC"), laptop, tablet, game console, set-top box or any other electronics device that can be communicatively coupled to the storage device 300 to store and retrieve data from the storage device. The processor 322 may process write commands from the host device by formatting the associated data and transferring the formatted data via a read/write channel 326 through the read/write head 304 and to the recording surface 302 of the disk. The processor 322 may further process read commands from the host device by determining the location of the desired data on the recording surface 302, positioning the read/write head(s) 304 over the determined location, reading the data from the surface via the read/write channel 326, correcting any errors and formatting the data for transfer to the host device. The read/write head 304 may be positioned to read or write data to one or more locations on a target data track on the on the recording surface 302 of the disk by moving the read/write head 304 radially across the tracks using the actuator 308 while a spindle motor 310 rotates the disk to bring the target location(s) under the read/write head.

The read/write channel 326 may convert data between the digital signals processed by the processor 322 and the analog read and write signals conducted through the read/write heads 304 for reading and writing data to the recording surfaces 302 of the disks. The analog signals to and from the read/write heads 304 may be further processed through a preamplifier (not shown). According to embodiments, the read/write channel 326 further includes a harmonic sensor 328. The harmonic sensor 328 may be configured to measure the harmonic strength at a chosen frequency in the read signal. The output of the harmonic sensor 328 may be utilized by the controller 320 to estimate fly height of the read/write heads 304, for example.

In order to provide for accurate positioning of the read/write heads 304 over target data track(s) on the recording surface 302 during read and write operations, the controller further includes a servo system. The servo system includes a servo controller 330 that utilizes servo data from the read/write channel 326 along with reference signals from the processor 322 to control a VCM driver 332 which causes the actuator 308 to position the read/write head 304 over a target data track on the recording surface 302 and maintain the position of the head substantially over the center of the target track throughout a read or write operation. The servo data from the read/write channel 326 may be generated by servo patterns detected on the recording surface(s) 302 of the disks during read or write operations. The servo controller 330 may comprise hardware circuits in the controller 320, processor-executable instructions for execution in the processor 322, or any combination of these and other components of the storage device 300.

The controller 320 may further include a computer-readable recording medium or "memory" 334 for storing processor-executable instructions, data structures and other information. The memory 334 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 334 may further comprise a portion of the storage media of the storage device 300, such as the maintenance cylinder ("M/C") of the disk. For example, the memory 334 may store a firmware that comprises commands and data necessary for performing the operations of the storage device 300. In some embodiments, the memory 334 may store processor-executable instructions that, when executed by the processor 322, perform the routines 100, 600 and 700 for detecting and compensating for a change in MR-offset in a disk-based storage device, as described herein.

In addition to the memory 334, the environment may include other computer-readable media storing program modules, data structures, and other data described herein for writing servo reference patterns in a storage device. It will be appreciated by those skilled in the art that computer-readable media can be any available media that may be accessed by the controller 320 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a MR-offset detection module 340. The MR-offset detection module 340 may utilize magnitude readings from the harmonic sensor 328 and a predetermined transfer function 200 stored in the memory 334 or other storage to detect a change in the MR-offset of a read/write head 304 in the storage device 300 utilizing the routines, methods, and procedures described herein. According to some embodiments, the MR-offset detection module 340 may be implemented in the controller 320 as software, hardware, or any combination of the two. For example, the MR-offset detection module 340 may be stored in the memory 334 as part of the firmware of the storage device 300 and may be executed by the processor 322 during user mode of the device when a NOS is detected that may result in actuator-shift. The MR-offset detection module 340 may alternatively or additionally be stored in other computer-readable media accessible by the controller 320. In further embodiments, the MR-offset detection module 340 may be implemented in a computing system external to and operably connected to the storage device 300, such as a host device, for example.

It will be appreciated that the structure and/or functionality of the storage device 300 may be different than that illustrated in FIG. 3 and described herein. For example, the processor 322, read/write channel 326, servo controller 330, VCM driver 332, memory 334 and other components and circuitry of the storage device 300 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 300 may not include all of the components shown in the FIG. 3, may include other components that are not explicitly shown in the figure or may utilize an architecture completely different than that shown in the figure.

Figure 4:
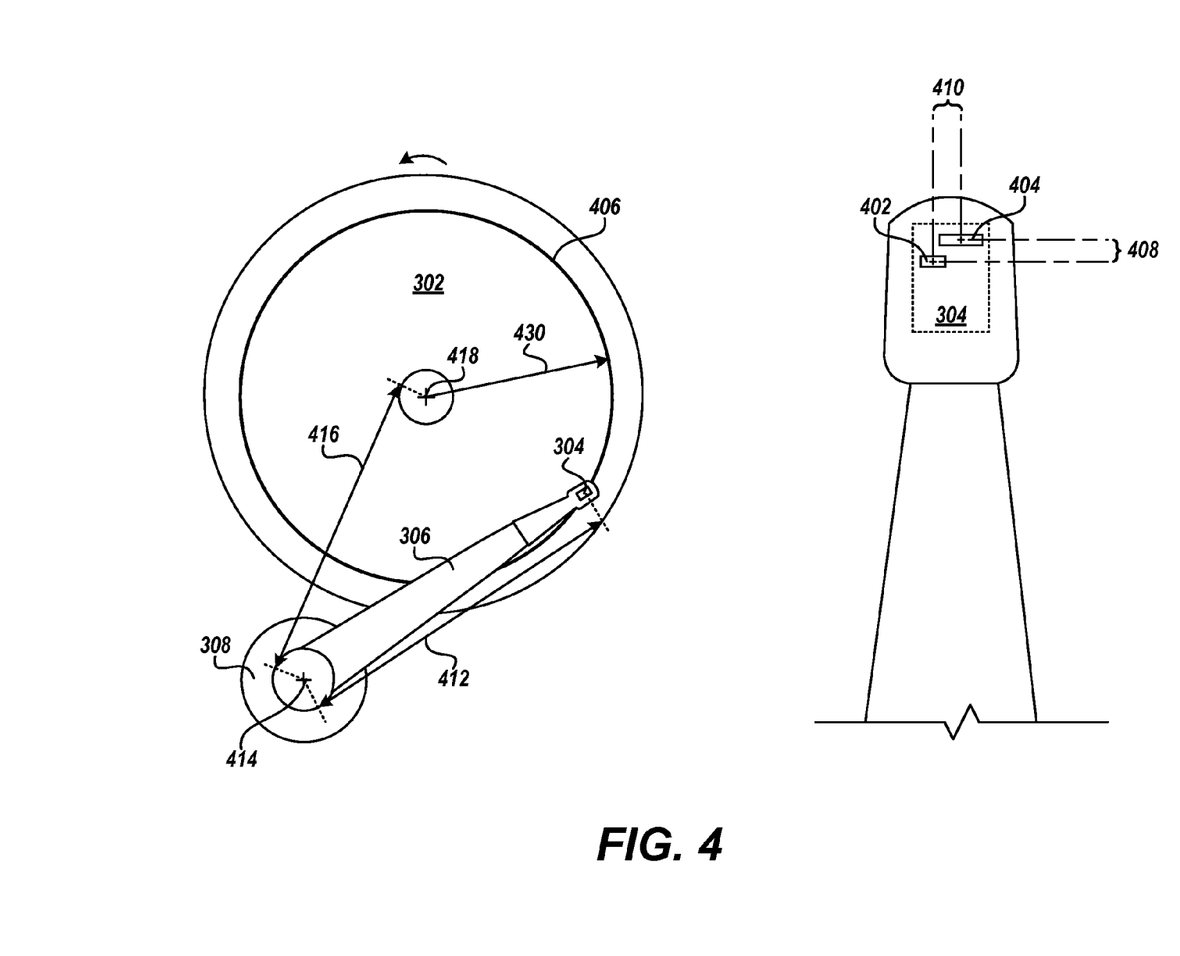
FIG. 4 is a block diagram showing additional details regarding the MR-offset of a read/write head, according to embodiments described herein.

FIG. 4 shows additional details of a read/write head 304 of the storage device 300 and the MR-offset associated with the head. As shown in the figure, the read/write head 304 may include one or more independent reader elements 402 and writer elements 404. The MR-offset for the read/write head 304 represents the relative positions of the respective centers of the writer element(s) 404 and the reader elements 402 with respect to a target data track 406 on the recording surface 302 of the disk, and varies for different radial positions of data tracks on the disk. The factors that influence the MR-offset may include:
- the distance 408 of separation between the reader element 402 and the writer element(s) 404 in the down-track direction,
- the distance 410 of any offset between the centers of the reader element 402 and the writer element(s) 404 in the cross-track direction,
- the distance 412 between the actuator pivot 414 and the read/write head 304,
- the distance 416 between the actuator pivot 414 and the spindle center 418,
- the track radius 420,
- and/or the like.

Because positioning of the read/write head 304 over the center of the data track 406 relies in part on the servo data read by the reader element 402 from the recording surface 302, the MR-offset of the head must be compensated for when reading and/or writing data to the track.

Figure 5:
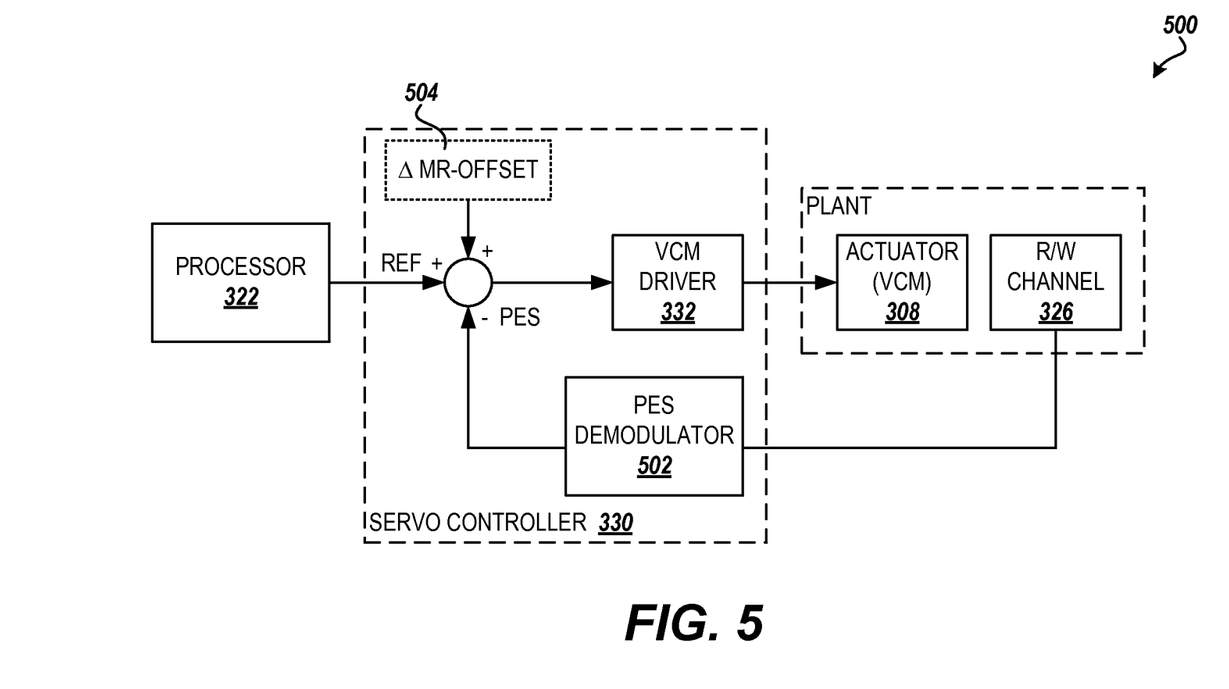
FIG. 5 is a block diagram showing additional details regarding utilizing a servo mechanism of the storage device to compensate for a change in MR-offset of a read/write head, according to embodiments described herein.

FIG. 5 shows an illustrative servo system 500 of an HDD apparatus, according to some embodiments. The processor 322 may provide a reference signal to the servo controller 330 that indicates the position of the target data track 406 on the recording surface 302 of the disk. The reference signal may include MR-offset information for the read/write head calculated by the controller in the initial MR-offset calibration described above. The servo controller 330 then provides the necessary signal to the VCM driver 332 that causes the actuator 308 to rotate such that the read/write head 304 is positioned over the target data track 406. During the read or write operation, the read/write head 304 reads the servo data written to recording medium and produces a position error signal ("PES"). The servo controller 330 receives the PES from the read/write channel 326 and processes the signal using a PES demodulator 502 to produce PES information. The PES information may include values indicating a displacement of the head from the center of the data track 406.

The PES information is provided combined with the reference signal in the servo controller 330 to adjust the signal to the VCM driver 332 in order to keep the read/write head 304 substantially aligned with the center of the target data track 406. According to embodiments provided herein, the processor 322 may also provide information regarding the change in MR-offset detected by the detection routines 100 and/or 600 described herein to the servo controller 330. For example, the processor 322 may provide an MR-offset change value 504 to the servo controller 330. The MR-offset change value 504 may then be combined with the reference signal and the PES to compensate for changes in MR-offset of the read/write head 304 due to non-operating shock or other internal or external stress conditions experienced to the storage device 300 after the initial MR-offset calibration during CERT testing, as will be described in more detail below in regard to FIG. 7.

Figure 6:
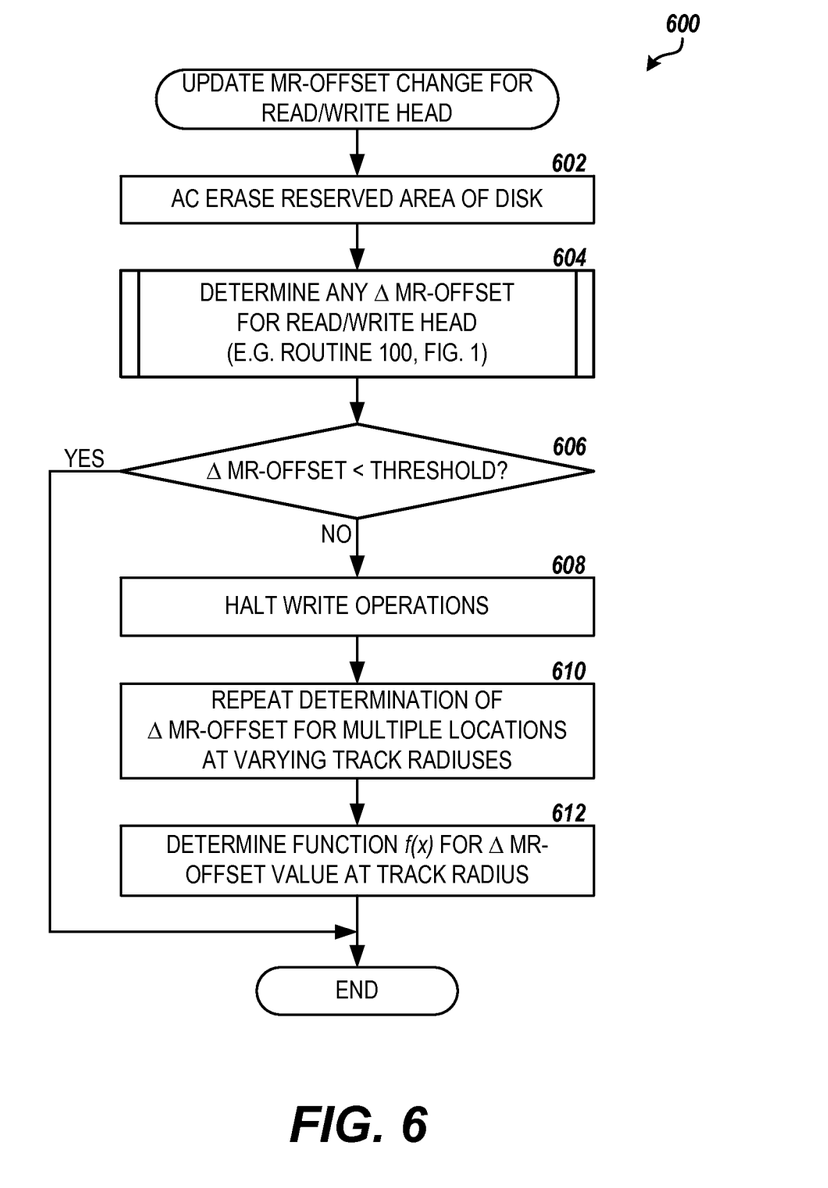
FIG. 6 is a flow diagram showing another routine for detecting change in MR-offset in a disk-based storage device, according to embodiments described herein.

FIG. 6 illustrates another routine 600 for detecting and updating any change in MR-offset for a read/write head 304 in a storage device 300. According to some embodiments, the routine 600 may be performed by the MR-offset detection module 340 described above in regard to FIG. 3 in response to a detection of shock or other stress condition in the user mode of the device. For example, the routine 600 may be performed when shock detection sensors in the storage device 300 detect that a physical shock has occurred during normal operation of the device or while the device was in an idle or powered-down state. Additionally or alternatively, the routine 600 may be executed for each read/write head 304 in the storage device 300 upon startup of the device. In further embodiments, the routine 600 may be performed when an increase in UDEs is detected or the like.

In some embodiments, the routine 600 includes step 602, where the MR-offset detection module 340 erase the reserved area of the recording surface 302 of the disk associated with the read/write head 304 utilizing an AC erase procedure before the data pattern is written to the reserved area. The AC erase procedure uses an alternating current (AC) induced magnetic field in the write elements of the read/write head to induce a 1T pattern on the recording surface, thus reducing background noise once subsequent data patterns are written. Next, at step 604, the MR-offset detection module 340 utilizes a routine similar to the routine 100 described above to determine any change MR-offset change in the read/write head 304 based on and the harmonic sensor magnitude and a transfer function. As further described above, the initial determination of the change in MR-offset for the head may be determined at the ID of the disk, where any change in MR-offset due to actuator-shift is likely to be maximized.

From step 604, the routine 600 proceeds to step 606, where the MR-offset detection module 340 determines whether the change in MR-offset for the read/write head 304 detected in step 604 is less than a threshold value. For example, it may be determined that a change in MR-offset of less than 5% may be compensated for utilizing any existing MR-offset information and other head-alignment corrections in the servo system 500. If the detected MR-offset is less than the threshold value, then the routine 600 ends and the storage device may return to normal operations. If the detected change in MR-offset for the read/write head 304 is not less than the threshold value, the routine 600 may proceed to step 608, where in the MR-offset detection module 340 may temporarily halt user data write operations for the storage device 300, according to some embodiments. In other embodiments, all user data operations may be temporarily halted.

From step 608, the routine 600 proceeds to step 610, where the MR-offset detection module 340 determines the change in MR-offset for the read/write head 304 at multiple locations on the associated recording surface 302 representing different track radiuses. For example, the routine 100 described above may be performed for other locations on the recording surface 302 using the harmonic sensor and the transfer function to calculate a change in MR-offset for each location. It will be appreciated that the other locations on the recording surface 302 may be similarly reserved as described above, or that any data currently stored in the other locations may be temporarily relocated before performing the determination of change in MR-offset. In addition, the other locations may be erased utilizing an AC erase procedure before the determination of change in MR-offset is performed.

From step, 610, the routine proceeds to step 612, where the MR-offset detection module 340 determines a function $f(x)$ for the read/write head 304 that relates the MR-offset change value to the radius of the target track 406 based on the change in MR-offset values determined for each location (including the reserved area as determined at step 604). For example, the MR-offset detection module 340 may fit an $n^{th}$ order polynomial function to the determined change in MR-offset values from the various track radiuses. The determined polynomial function $f(x)$ may then be stored in the memory 334 of the controller 320 associated with the read/write head 304. From step 612, the routine 600 ends.

According to some embodiments, if the detected change in MR-offset is greater than some maximum threshold value, then the MR-offset detection module 340 may perform a new MR-offset calibration procedure for the read/write heads 304 of the storage device 300. The new MR-offset calibration procedure may be performed in a fashion similar to that performed during CERT processing of the storage device 300. Alternatively, the new MR-offset calibration procedure may be performed utilizing a routine similar to the routine 600 described above. A result of the new MR-offset calibration procedure may be a new transfer function 200, which may then be stored in the memory 334 or other storage area of the storage device 300. It will be appreciated that performing the new MR-offset calibration procedure may take some time, and that the storage device 300 may be unavailable to the connected host device during this period or write operations for the device may be cached while the MR-offset calibration procedure is being performed. In further embodiments, a routine similar to the routine 600 described above may be utilized in CERT processing of the storage device 300 to perform the initial MR-offset calibration, resulting in improved performance of the CERT processing.

Figure 7:
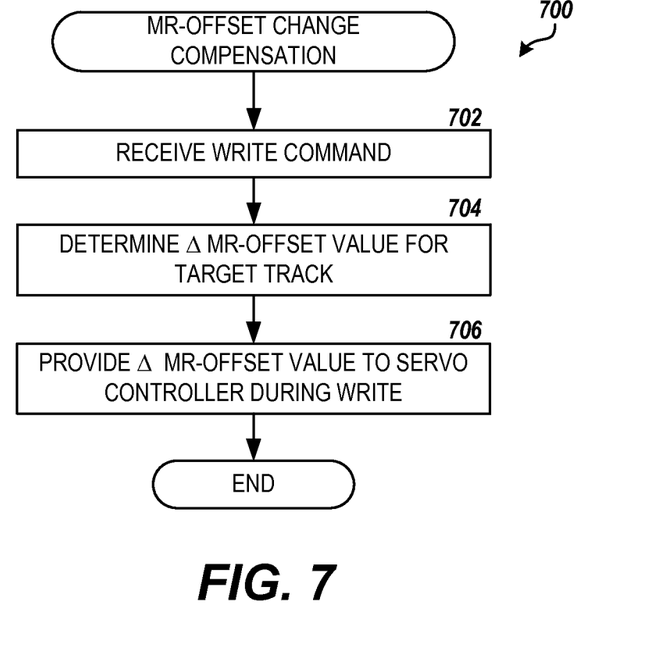
FIG. 7 is a flow diagram showing one routine for compensating for a change in MR-offset in a disk-based storage device, according to embodiments described herein.

FIG. 7 illustrates one routine 700 for compensating for change in MR-offset for a read/write head 304 in a storage device 300. According to some embodiments, the routine 700 may be performed by a controller 320 of the storage device 300 during a write operation targeting the read/write head 304 subsequent to detection of a change in MR-offset resulting from a shock or other stress condition experienced in the user mode of the device. The routine 700 includes step 702, where the controller 320 receives a write command targeting the read/write head 304. The write command may be received from a connected host device, for example.

From step 702, the routine 700 proceeds to step 704, where the controller 320 determines an MR-offset change value 504 for the target data track 406. For example, the controller may utilize the polynomial function $f(x)$ determined in step 612 of routine 600 described above in regard to FIG. 6 to calculate the MR-offset change value 504 for the track radius. In some embodiments, the function $f(x)$ associated with the read/write head 304 may be retrieved from the memory 334. Next, the routine 700 then proceeds to step 706, where the controller 320 supplies the MR-offset change value 504 calculated for the target data track 406 to the servo controller 330 for use during the write operation, as described above in regard to FIG. 5. From step 706, the routine 700 ends.

Based on the foregoing, it will be appreciated that technologies for detecting and compensating for a change in MR-offset in a disk-based storage device are presented herein. While embodiments are described herein in regard to an HDD apparatus, it will also be appreciated that the embodiments described in this disclosure may be utilized by any disk-based storage device implementing with separate reader and writer elements similar to that described above. This may include a magnetic disk drive, a hybrid magnetic and solid state drive, an optical disk drive, and the like. Additionally, the embodiments describe herein may be utilized in in storage devices implementing multiple reader elements. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for determining a change in MR-offset of a read/write head in a storage device, the method comprising steps of:
   writing a pattern to a track on a disk of the storage device utilizing the read/write head;
   configuring a read channel of the storage device as a harmonic sensor;
   reading the pattern from the track at a specific off-track position of the read/write head;

measuring a magnitude value from the harmonic sensor during the read; and calculating the change in MR-offset for the read/write head based on the measured magnitude value and a predetermined transfer function between off-track amount and harmonic sensor magnitude, wherein the change in MR-offset is utilized by a servo mechanism of the storage device to correct head positioning during a write operation for the read/write head.

2. The method of claim 1, wherein the change in MR-offset is determined for each read/write head of the storage device in response to a detection of a non-operating shock in the storage device.

3. The method of claim 1, wherein the pattern corresponds to a write signal of a specific frequency, and wherein the harmonic sensor is configured to detect the specific frequency.

4. The method of claim 1, wherein the track is located in a reserved area located at a substantially inner diameter of the disk.

5. The method of claim 4, further comprising steps of:
erasing the reserved area of the disk utilizing an AC erase procedure prior to writing the pattern to the track.

6. The method of claim 1, wherein the pattern is written to a portion of the track allowing the configuring of the read channel as the harmonic sensor to be performed before the disk rotates back to a beginning of the written track.

7. The method of claim 1, wherein the specific off-track position is determined based on a range of linearity in the predetermined transfer function.

8. The method of claim 1, wherein the predetermined transfer function is determined for the storage device at a CERT testing of the storage device and is stored in a memory of the storage device.

9. The method of claim 1, further comprising steps of:
upon determining that the change in MR-offset is not less than a threshold value, repeating the writing, configuring, reading, measuring, and calculating steps for a plurality of tracks on the disk at varying radiuses; and
determining a function relating MR-offset change value to track, wherein the function is utilized to determine an MR-offset change value for a target track of the write operation.

10. The method of claim 1, wherein the storage device is a hard-disk drive apparatus.

11. A storage device comprising:
a processor; and
a memory operably connected to the processor and containing an MR-offset change detection module configured to
write a pattern based on a specific frequency to a track on a recording surface of the storage device,
configure a read channel of the storage device as a harmonic sensor for the specific frequency,
read the pattern from the track at a specific off-track position,
measure a magnitude value from the harmonic sensor during the read,
calculate a change in MR-offset for a read/write head associated with the recording surface based on the measured magnitude value and a transfer function, the transfer function expressing a relationship between off-track amounts and harmonic sensor magnitudes,
determine whether the change in MR-offset is less than a threshold value,
upon determining that the change in MR-offset is not less than the threshold value, repeat the write, configure, read, measure, and calculate steps for a plurality of tracks on the recording surface at varying radiuses,
determine a function relating MR-offset change value to track, and
store the function in the memory associated with the read/write head.

12. The storage device of claim 11, where the memory further contains processor-executable instructions that cause the processor to:
receive a write command targeting the read/write head;
calculate an MR-offset change value for a target data track of the write command from the function stored in the memory; and
provide the MR-offset change value to a servo mechanism of the storage device to correct head positioning during the write command.

13. The storage device of claim 11, wherein the change in MR-offset is calculated for each read/write head in the storage device in response to the detection of a non-operating shock in the storage device.

14. The storage device of claim 11, wherein the track is located in a reserved area of the recording surface located substantially at an inner diameter of a disk containing the recording surface.

15. The storage device of claim 14, wherein the MR-offset change detection module is further configured to erase the reserved area of the recording surface utilizing an AC erase procedure prior to writing the pattern to the track.

16. The storage device of claim 11, wherein the transfer function is determined for the storage device at a CERT testing of the storage device and is stored in the memory.

17. A non-transitory computer-readable medium having processor-executable instructions stored thereon that, when executed by a processor operably connected to a storage device, cause the processor to:
write a specific frequency pattern to a track in a reserved area of a disk of the storage device,
configure a read channel of the storage device as a harmonic sensor for the specific frequency,
read the track in the reserved area at a specific off-track position,
measure a magnitude value from the harmonic sensor during the read,
calculate a change in MR-offset for a read/write head associated with the disk based on the measured magnitude value and a transfer function expressing a relationship between off-track amounts and harmonic sensor magnitudes, wherein the change in MR-offset is utilized by a servo mechanism of the storage device to correct head positioning during a write operation for the read/write head.

18. The computer-readable medium of claim 17, wherein the reserved area is located substantially at an inner diameter of the disk.

19. The computer-readable medium of claim 17, having further processor-executable instructions stored thereon that cause the processor to:
upon determining that the change in MR-offset is not less than a threshold value, repeat the writing, configuring, reading, measuring, and calculating steps for a plurality of tracks on the disk at varying radiuses; and
determining a function relating MR-offset change value to track, wherein the function is utilized to determine an MR-offset change value for a target track of the write operation.

20. The computer-readable medium of claim 17, wherein the storage device is a hard-disk drive ("HDD") apparatus.

* * * * *